United States Patent
Dorrer

(10) Patent No.: US 7,298,489 B2
(45) Date of Patent: Nov. 20, 2007

(54) METHOD AND APPARATUS FOR CHARACTERIZING THE ELECTRIC FIELD OF PERIODIC AND NON-PERIODIC OPTICAL SIGNALS

(75) Inventor: Christophe J. Dorrer, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 369 days.

(21) Appl. No.: 11/129,244

(22) Filed: May 13, 2005

(65) Prior Publication Data

US 2007/0041728 A1 Feb. 22, 2007

(51) Int. Cl.
*G01B 9/02* (2006.01)
(52) U.S. Cl. .................................. 356/450
(58) Field of Classification Search ............. 356/450, 356/484
See application file for complete search history.

(56) References Cited

U.S. PATENT DOCUMENTS

| | | | | |
|---|---|---|---|---|
| 4,792,230 A | * | 12/1988 | Naganuma et al. | 356/450 |
| 5,530,544 A | * | 6/1996 | Trebino et al. | 356/450 |
| 6,219,142 B1 | * | 4/2001 | Kane | 356/450 |
| 6,819,428 B2 | * | 11/2004 | Ogawa | 356/450 |
| 7,042,629 B2 | * | 5/2006 | Doerr et al. | 359/325 |
| 7,053,996 B2 | * | 5/2006 | Ogawa | 356/73.1 |
| 7,133,135 B2 | * | 11/2006 | Dorrer | 356/450 |
| 2003/0011776 A1 | * | 1/2003 | Ogawa | 356/450 |
| 2005/0058449 A1 | * | 3/2005 | Ogawa | 398/9 |
| 2005/0185187 A1 | * | 8/2005 | Dorrer | 356/450 |

* cited by examiner

*Primary Examiner*—Patrick Connolly

(57) ABSTRACT

An interferometric technique measures the time-dependent electric field of a periodic or a non-periodic (data-encoded) optical signal under test using samples of its interference with a reference source of short optical pulses. The reference signal is a sequence of optical pulses at a repetition rate different from that of the signal under test. The difference in repetition rates of the two signals performs a scanning of the relative delay between the two signals, i.e. each pulse from the reference signal will overlap with the signal under test at a different time. The real and imaginary part of each of the plurality of interference between the two signals are then measured to determine samples of the electric field of the optical signal under test at each of those times. When needed, various types of averaging are performed on the samples of the electric field. If the signal under test is a data-encoded source, averaging is performed on groups of samples corresponding to the same symbol state of the data-encoded source.

17 Claims, 6 Drawing Sheets

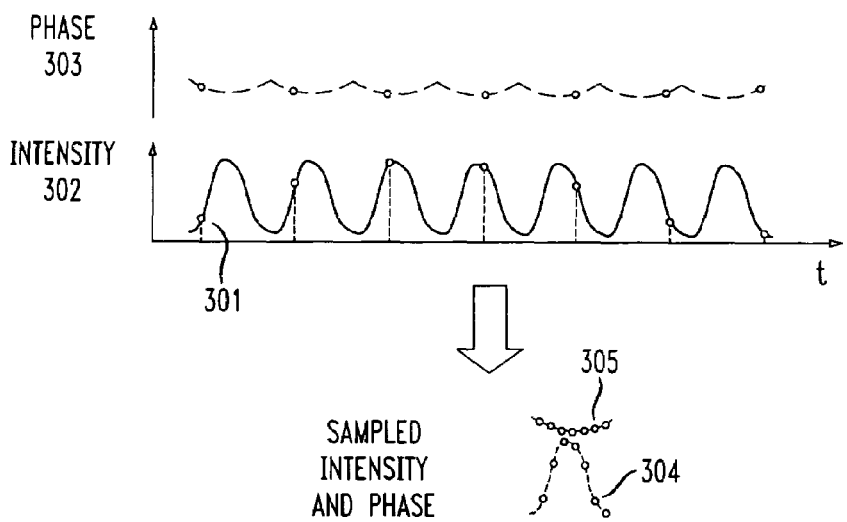
*FIG. 3A*
*FIG. 3B*
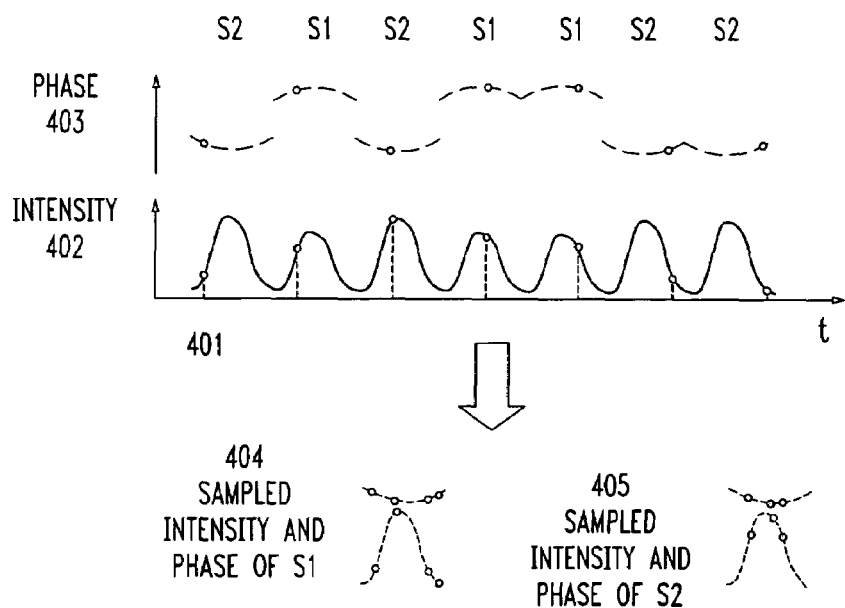
*FIG. 4A*
*FIG. 4B*

BEFORE AVERAGING 901

AFTER AVERAGING 902

METHOD AND APPARATUS FOR CHARACTERIZING THE ELECTRIC FIELD OF PERIODIC AND NON-PERIODIC OPTICAL SIGNALS

RELATED APPLICATIONS

Related subject matter is described in the pending application entitled "LINEAR OPTICAL SAMPLING METHOD AND APPARATUS," Ser. No. 10/782,003, filed on Feb. 19, 2004 and in the pending application entitled "METHOD AND APPARATUS FOR THE DIRECT CHARACTERIZATION OF THE PHASE OF AN OPTICAL SIGNAL," Ser. No. 10/783,305, filed on Feb. 20, 2004.

TECHNICAL FIELD OF THE INVENTION

This invention relates generally to linear optical sampling and, more particularly, to the characterization of the electric field of periodic and non-periodic optical signals using sampled test-plus-reference interferometry.

BACKGROUND OF THE INVENTION

Self-referencing techniques measuring the temporal electric field of a short pulse require a non-stationary element. For example, self-referencing interferometric techniques can be implemented with a nonlinear interaction, a high-speed phase modulator, or a fast photodetector. There is however no such requirement for test-plus-reference interferometric techniques that measure the interference of the pulse under test with a reference pulse. In spectral interferometry, these two sources are combined and sent to an optical spectrum analyzer. The field of the signal under test $\tilde{E}_{TEST}(\omega)$ is obtained from the spectrally-resolved interferometric component $\tilde{E}_{TEST}(\omega)\tilde{E}^*_{REF}(\omega)$ and the known field of the reference signal $\tilde{E}^*_{REF}(\omega)$. The principle of Fourier-transform spectroscopy can also be applied to measure the time-averaged interference between the signal under test $E_{TEST}(t)$ and a reference signal $E_{REF}(t)$ as a function of the relative delay between the two signals, which leads to the Fourier transform of the interferometric component measured by spectral interferometry. The time-averaged interference of two uncorrelated optical sources is zero, and test-plus-reference interferometric techniques are usually applied when the reference pulse and pulse under test originate from the same optical source, for example for chromatic dispersion measurements.

Linear optical sampling measures samples of the interference of the source under test with a train of short optical pulses. This technique was described in my pending application entitled "LINEAR OPTICAL SAMPLING METHOD AND APPARATUS," Ser. No. 10/782,003, filed on Feb. 19, 2004. In that application, intensity samples were measured on a non-periodic (e.g., data-encoded) telecommunication signal, the intensity samples were then arranged in a statistical representation such as an eye diagram. The measurement of phase samples of a data-encoded signal was described in my pending application entitled "METHOD AND APPARATUS FOR THE DIRECT CHARACTERIZATION OF THE PHASE OF AN OPTICAL SIGNAL," Ser. No. 10/783,305, filed on Feb. 20, 2004. In that application, only samples of the data-encoded signal at a given position in the bit slot were used. Notwithstanding the advances described in these applications, what is needed is a more general linear optical sampling technique for the complete characterization of both the amplitude and phase of the electric field of periodic and non-periodic optical signals.

SUMMARY OF THE INVENTION

In accordance with the present invention, a sampled test-plus-reference interferometric technique is used to measure the time-dependent electric field of a periodic and non-periodic (data-encoded) optical signals using samples of its interference with a reference source of short optical pulses. Compared to other test-plus-reference techniques such as spectral interferometry and Fourier-transform spectroscopy, the technique is applicable when the signal under test and reference signal do not originate from the same source. The technique is highly sensitive and allows the direct real-time characterization of optical sources and the extraction of a coherent periodic signal in an incoherent background.

More specifically, the present invention describes a method of and apparatus for characterizing the electric field of an optical signal (Source under test) that includes a sequence of optical pulses at a first repetition rate ($T_{TEST}$). The optical signal under test is combined with a reference signal. The reference signal is a sequence of optical pulses at a second repetition rate $T_{REF}$ that is equal to $MT_{TEST}+\delta t$, where M is an integer and $\delta t$ is a fraction of $T_{TEST}$. The difference in repetition rates of the two sources performs a scanning of the relative delay between the two signals, i.e. each pulse from the reference signal will overlap with the source under test at a different time. The real and imaginary parts of each of the plurality of interference between the two signals are then measured to determine the electric field of the optical signal under test every $\delta t$.

One feature enables various types of averaging on the measured electric field, its amplitude and/or its phase. For samples of a data-encoded source, averaging is performed on groups of samples corresponding to the same symbol state of the data-encoded source.

BRIEF DESCRIPTION OF THE DRAWINGS

The present invention will be more fully appreciated by consideration of the following Detailed Description, which should be read in light of the accompanying drawing in which:

FIGS. 3A and 3B illustrate the technique for amplitude and phase sampling of periodic signals in accordance with the present invention.

FIGS. 4A and 4B illustrate the technique for amplitude and phase sampling of non-periodic signals in accordance with the present invention.

In the following description, identical element designations in different figures represent identical elements. Additionally in the element designations, the first digit refers to the figure in which that element is first located (e.g., 101 is first located in FIG. 1).

DETAILED DESCRIPTION

Figure 1A:
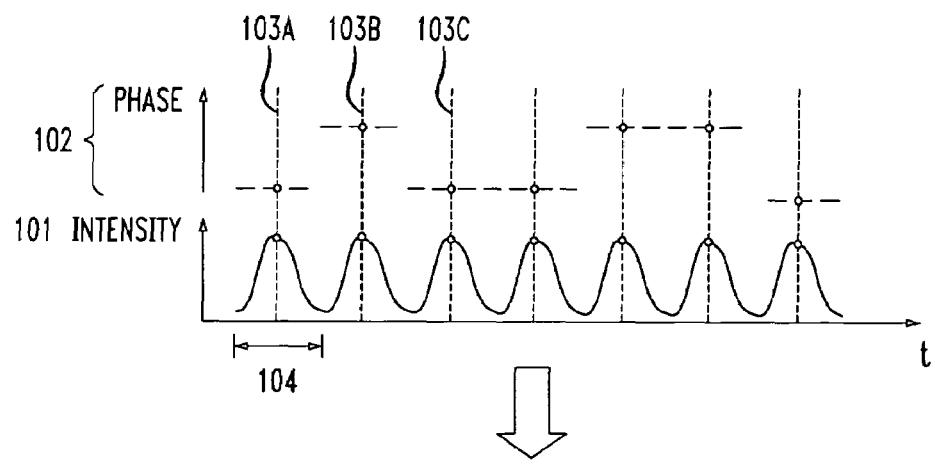
FIGS. 1A and 1B illustrate the technique for amplitude and phase sampling of non-periodic signals described in the previously-referenced application Ser. No. 10/783,305.
Figure 1B:
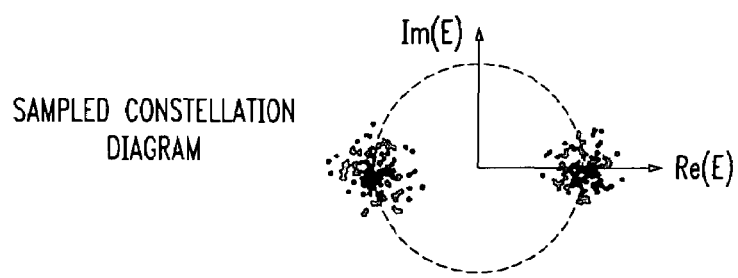

In my previously-referenced application Ser. No. 10/783, 305, which is incorporated by reference herein, samples of the electric field (intensity 101 and phase 102) of a data-encoded signal are measured. Illustratively, samples of a binary phase shift keyed (BPSK) data-modulated signal are measured to obtain a constellation diagram. To measure the electric field of the BPSK data-modulated signal only samples taken at the center of the bit are used. As shown in FIG. 1A, the intensity 101 (i.e., the square of the amplitude of the electric field) of the BPSK data-modulated signal is essentially periodic and the phase 102 has two different phase levels separated by a $\pi$ phase shift. The intensity and phase samples (shown as dots) measured at the center (or at a predetermined position, shown as 103A, 103B, 103C) of various bit slots 104 are processed to give a statistical representation of the electric field only at the sampled time, which is illustratively shown in FIG. 1B as a Sampled constellation diagram in the complex plane.

Figure 2A:
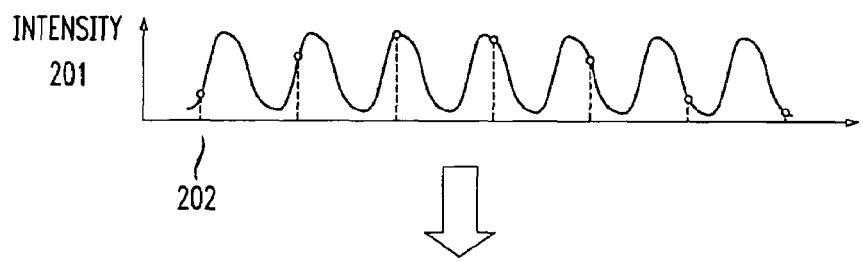
FIGS. 2A and 2B illustrate the technique for amplitude sampling of periodic signals described in the previously-referenced application Ser. No. 10/782,003.
Figure 2B:

In my previously-referenced application Ser. No. 10/782, 003, which is incorporated by reference herein, samples of the intensity of a periodic or non-periodic signal (e.g., a data-encoded signal) 201 are measured. As shown in FIG. 2A, samples (shown as dots) of the intensity of signal 201 are measured at many times, e.g., 202, each sample is taken at a different time in the bit slot of the source. However, no samples of the phase of signal 201 are measured These intensity samples are processed in order to represent the intensity of a periodic source 201 (as shown in FIG. 2A) or to give a statistical representation (e.g., an "eye diagram") of the intensity of a non-periodic signal (e.g., a data-encoded signal—not shown in FIG. 2B). As illustratively shown in FIG. 2B, the intensity samples of the non-periodic signal 201 are processed to provide the samples into a one bit slot representation 203 of the intensity of the signal 201.

In accordance with the test-plus-reference interferometric technique of the present invention, samples of the electric field of a periodic signal source (also referred to as a Source under test) are measured at various times in different bit slots of the periodic source to provide a complete characterization of the electric field of the periodic waveform (i.e. its temporal intensity and phase). If the Source under test is a non-periodic source (e.g., a data-encoded signal) samples of the electric field are taken at a subset of the time slots of the time-varying waveform to provide a complete characterization of the electric field during that subset of the time slots (i.e. the temporal intensity and phase of that subset of time slots). Illustratively as shown in FIG. 3A, samples (shown with dots) are measured at various times 301 of a waveform with periodic electric field, i.e. periodic intensity 302 and periodic phase 303. As shown in FIG. 3B, the samples are then processed and organized as a representation for one bit time of the periodic intensity 304 and periodic phase 305 of the electric field of the source. With reference to FIG. 4A, there is shown illustratively, samples 401 (shown with dots) of the intensity 402 and phase 403 of the electric field of a binary phase shift keying (BPSK) data-encoded waveform. The BPSK waveform is composed of two different symbols S1 and S2 each with a different phase 403 and hence a different electric field. In accordance with the present invention, bit periods are sampled at different times, as shown by 401. In FIG. 4B, the samples of the two different symbols S1 and S2 are separately processed and organized as a separate representation of the intensity and phase of the electric field for each of the two symbols S1 and S2, shown as 404 and 405, respectively.

As shown in FIGS. 3 and 4 and in accordance with the present invention, the application of my test-plus-reference interferometric technique (also referred to as a linear optical sampling technique) enables samples of the interference of a periodic or a non-periodic optical source (Source under test) with a reference signal (sampling signal) to be combined in order to completely characterize the electric field of that Source under test. While FIG. 4A illustrates a BPSK type data-encoded waveform as the non-periodic Source under test, it should be understood that my sampling technique can be used with other types of amplitude and phase modulated signals, such as signals using on/off keying (OOK), quadrature-amplitude modulation (QAM), and quadrature phase shift keying (QPSK).

Figure 5A:
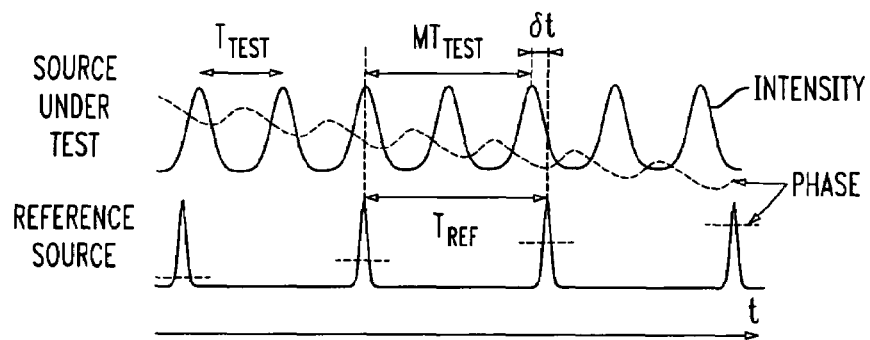
FIGS. 5A and 5B show illustrative Source under test and Reference source signals applied to a linear optical sampling circuit to produce the sampled intensity and phase signals shown in FIGS. 3 and 4.

With reference to FIG. 5A, the Source under test includes a sequence of optical pulses at a first repetition rate ($T_{TEST}$) and the Reference signal is a sequence of optical pulses at a second repetition rate ($T_{REF}$) that is equal to $MT_{TEST}+\delta t$, where M is an integer and $\delta t$ is a fraction of $T_{TEST}$. As will be discussed in more detail in a later paragraph, in the linear optical sampling circuit of FIG. 5B, the Source under test signal is combined with the Reference signal to form an interference signal at each of a plurality of times in the bit slot of the Source under test. The linear optical sampling circuit then measures the real and imaginary part of each of the plurality of interference signal to determine the electric field of the Source under test at this plurality of times. The technique is applicable whether or not the Source signal and Reference signal originate from the same source. The technique is highly sensitive and it allows the direct real-time characterization of optical sources and the extraction of a coherent periodic signal in an incoherent background.

Figure 5B:
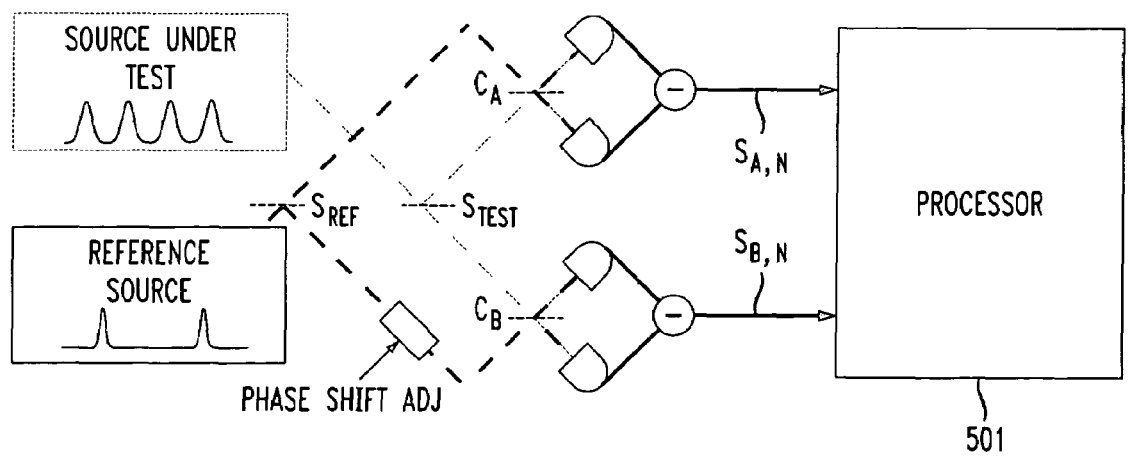

The electric field of the Reference source (also referred to as a Periodic Sampling source) and Source under test are respectively:

$$\varepsilon_{REF}(t) = \sum_N E_{REF}(t - NT_{REF})\exp[-i\omega_0(t - NT_{REF}) + iN\varphi_{REF}] \quad (1)$$

$$\varepsilon_{TEST}(t) = E_{TEST}(t)\exp(-i\omega_0 t) \quad (2)$$

with $E_{TEST}(t-NT_{TEST})=E_{TEST}(t)\exp[i\omega_0 NT_{TEST}+iN\phi_{TEST}]$. $T_{TEST}$ and $T_{REF}$ are the periods of the Source under test and Reference (Sampling) signal, and $\phi_{TEST}$ and $\phi_{REF}$ take into account the pulse-dependent position of the carrier under the envelope of each source. With reference to FIG. 5B, the sources are split by the splitters $S_{TEST}$ and $S_{REF}$ and recombined by combiners $C_A$ and $C_B$. The recombining in each of combiners $C_A$ and $C_B$ results in a sampling of the Source under test by the Sampling signal thereby forming interference signals at the output of each combiner. The two interference signal outputs of combiner $C_A$ are sent to the two detectors of a balanced detector BDA, which generates the signal $S_{A,N}$. The two interference signal outputs of combiner $C_B$ are sent to the two detectors of a balanced detector BDB, which generates the signal $S_{B,N}$. Each of the balanced detectors BDA and BDB have a bandwidth that is larger than the repetition rate $1/T_{REF}$ of the Reference sampling source and smaller than the bandwidth of the two sources. Equivalently, in the time domain, the impulse response of the photodetectors is shorter than the period of the reference source, but longer than the typical temporal variations of the two sources. One of the optical paths between the splitters and combiners includes an adjustable phase shifter PS to adjust the optical phase so that the measured signals $S_{A,N}$ and $S_{B,N}$ correspond to the real and imaginary part of the interference between the Source under test and the $N^{th}$ pulse from the Sampling source. In processor 501 (during step 601 of FIG. 6), a collection of the samples $S_{A,N}$ and $S_{B,N}$ of the interference between the Source under test and the Sampling source are obtained spanning a period of the Source under test. In processor 501 (during step 602 of FIG. 6) the signals $S_{A,N}$ and $S_{B,N}$ are numerically combined as $S_N = S_{A,N} + iS_{B,N}$ (during step 602 of FIG. 6) to yield a complex sample given by $$S_N = \exp[-iN(\omega_0 T_{REF} + \varphi_{REF})] \cdot \int_{-\infty}^{\infty} E_{TEST}(t + NT_{REF}) \cdot E^*_{REF}(t)dt$$

One defines $\delta t = T_{REF} - MT_{TEST}$, where M is an integer, so that $\delta t$ is smaller than the period of the source under test. The choice of M is guided by practical considerations on the implementation of the reference source and the detection system. For example, typical mode-locked fiber lasers operate at repetition rates of the order of 10 MHz. Analog-to-digital converters that can be used for implementation of the present invention usually operate at frequencies lower than 1 GHz. Choosing a reference source operating at 10 MHz and appropriate photodetection and electronics, a source under test with a repetition rate equal to 10 GHz will lead to a value for M of the order of 1000. $\delta t$ is chosen in order to properly describe the variations of the source under test, i.e. must be chosen small enough so that the sampling of the electric field of the source under test every $\delta t$ properly describes the properties of the source. $S_N$ can be written as:

$$S_N = \exp[iN(M\omega_0 T_{TEST} + M\varphi_{TEST} - \omega_0 T_{REF} - \varphi_{REF})] \cdot \qquad (3)$$
$$\int_{-\infty}^{+\infty} E_{TEST}(t + N\delta t) \cdot E^*_{REF}(t)dt$$

Figure 8:
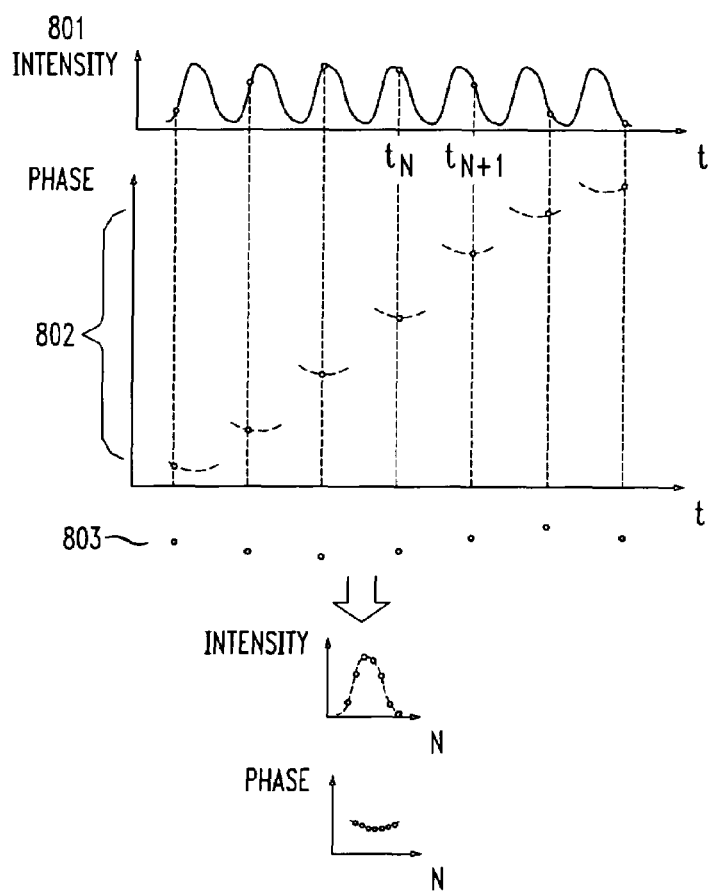
FIG. 8 illustrates the measured phase and the adjusted phase for a Source under test.

The quantity $\int E_{TEST}(t+N\delta t) \cdot E^*_{REF}(t)dt$ is a measurement of $E_{TEST}(t)$ at time $N\delta t$ with an impulse response $E^*_{REF}(-t)$. The samples $S_N$ are the product of two terms, as can be seen in Eq. 3. The first term is a phase-only term, where the phase is $N(M\omega_0 T_{TEST} + M\varphi_{TEST} - \omega_0 T_{REF} - \varphi_{REF})$. This phase depends upon the integer N, i.e. for two successive samples $S_N$ and $S_{N+1}$, this phase will increase by the quantity $M\omega_0 T_{TEST} + M\varphi_{TEST} - \omega_0 T_{REF} - \varphi_{REF}$, which does not depend upon N. The second term $$\int_{-\infty}^{+\infty} E_{TEST}(t + N\delta t) \cdot E^*_{REF}(t)dt$$

is a convolution of the electric field of the source under test with the electric field of one of the pulses from the reference source. The latter corresponds essentially to a measurement of the electric field of the source under test at time $N\delta t$, and multiple samples scan a representative period of the source under test. By adjusting the rate of the Sampling source, $\delta t$ can be chosen small enough to satisfy the Nyquist sampling theorem for $E_{TEST}$, and a collection of $T_{TEST}/\delta t$ successive samples spanning a period of the Source under test then completely characterize the electric field (during step 603 of FIG. 6). When the phases $\phi_{TEST}$ and $\phi_{REF}$ are stable over the time it takes to measure such collection (which is of the order of $T_{REF}T_{TEST}/\delta t$), the sample-dependent phase $N(M\omega_0 T_{TEST} + M\phi_{TEST} - \omega_0 T_{REF} - \phi_{REF})$ is a linear function of N. This is shown in FIG. 8, where the measured phase 802 is shown to vary as a linear function of N. The physical (or adjusted) phase 803 is obtained by subtracting out the linear phase component from the measured phase 802 (during step 604 of FIG. 6). Note that while the linear phase component can be calculated exactly if one knows $T_{TEST}$, $T_{REF}$, $\phi_{TEST}$ and $\phi_{REF}$, it is usually sufficient to remove an arbitrary linear phase from the measured phase for display purposes.

Using the relation $S(\tau) = \int E_{TEST}(t+\tau) \cdot E^*_{REF}(t)dt = \int \tilde{E}_{TEST}(\omega)\tilde{E}^*_{REF}(\omega)\exp(-i\omega\tau)d\omega$, $S_N$ simplifies to $E_{TEST}(N\delta t)$ if the sampling source has flat spectral density and phase over the support of the Source under test, which can be achieved in practice using a Fourier-transform limited sampling pulse with bandwidth encompassing that of the Source under test. As the Fourier transform of $S(\tau)$ is $\tilde{E}_{TEST}(\omega)\tilde{E}^*_{REF}(\omega)$, a collection of temporal samples measured with linear optical sampling is equivalent to a collection of spectral samples measured by spectral interferometry. However, the interference between the two sources would average to zero when measured over multiple sampling events due to its phase dependence. The present technique can also be seen as a sampled version of Fourier-transform spectroscopy where the two quadratures of the interferometric component are measured for each sampling pulse. A conventional Fourier-transform spectroscopy setup measures the time average of one of the quadratures and is identical to spectral interferometry in its phase requirement. Sampled single-quadrature measurements [For example, see F. Keilmann, C. Gohle, and R. Holzwarth, Time-domain mid-infrared frequency-comb spectrometer, *Opt. Lett.* 29, 1542-1544 (2004)] require control of the frequency comb of the two sources to provide time-domain fringes that can be processed, and would in principle require sampling at twice the optical frequency of the sources to recover the optical spectrum unambiguously (which is usually of no interest in our application). Dual-quadrature detection alleviates the need for quickly-varying time-domain fringes. As in other test-plus-reference techniques, a collection of samples can be deconvolved to remove the effect of $E_{REF}$. As the sample-dependent linear temporal phase is unknown, the technique does not measure the absolute position of the interferometric component on the optical frequency axis. Such information can be obtained via other means, for example a measurement of the spectrum of the sources by an optical spectrum analyzer. $\tilde{E}_{TEST}(\omega)\tilde{E}^*_{REF}(\omega)$ is then divided by the known $\tilde{E}_{REF}(\omega)$, and Fourier transformed back to the temporal domain. This operation is not needed if the sampling source has a flat spectral density and phase over the support of the Source under test.

Figure 6:
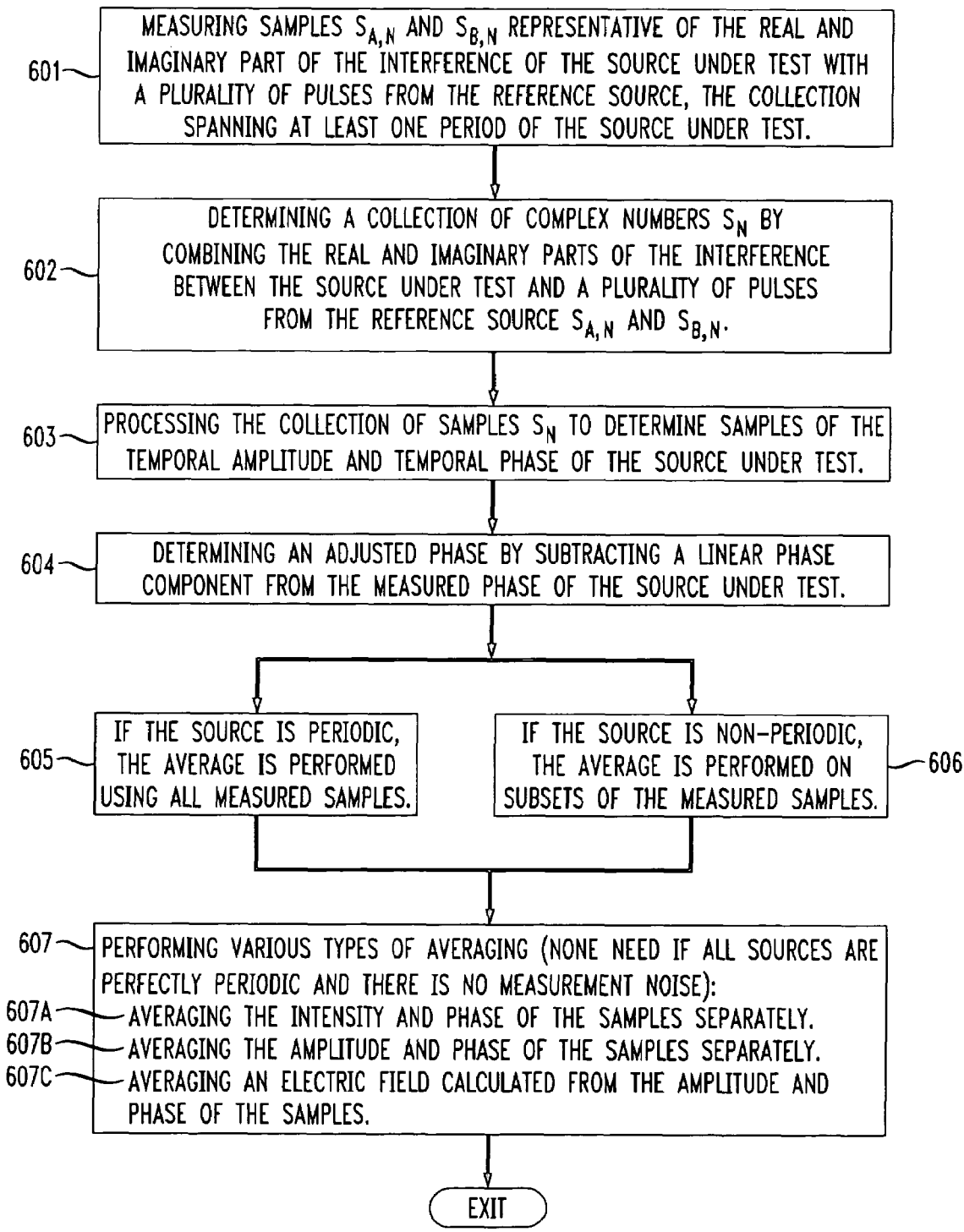
FIG. 6 shows illustrative processing steps performed by the processor of FIG. 5B.

To allow the removal of fluctuations of the phase of the two sources during the measurement and the extraction of a periodic signal from a Source under test with random fluctuations, several averaging techniques can be performed by signal processor 501 (during step 607 of FIG. 6).

Before the averaging techniques are described, the various processing steps performed by Processor 501 are briefly reviewed in FIG. 6. In step 601 a collection of $T_{TEST}/\delta t$ successive samples $S_{A,N}$ and $S_{B,N}$ are obtained. In step 602 a collection of complex numbers ($S_N$) is formed from samples $S_{A,N}$ and $S_{B,N}$. In step 603, the amplitude and phase of those samples that characterizes the Source under test are determined. In step 604, the adjusted phase is determined by subtracting a linear phase component from the measured phase of the Source under test. In step 605, the Processor 501 performs one of the various averaging functions, if needed. Note that no averaging is needed if the Source under test is perfectly periodic, and the phase of the source under test and reference source are stable. Assuming that averaging is needed, multiple samples corresponding to a given time in the bit slot of the source under test can be averaged. This is justified by the fact that, for a perfectly periodic source with period $T_{TEST}$ sampled without noise, the amplitude and phase measured at a time $p\delta t$, $p\delta t + T_{TEST}$, $p\delta t + 2T_{TEST}$, and more generally $p\delta t + qT_{TEST}$, where p and q are arbitrary integers, should be identical. Therefore, the complex samples corresponding to the description of the electric field of the source under test at these various times can be averaged in a variety of way to cancel the effect of noise due to the measurement apparatus, or the effect of non-periodic fluctuations of the electric field of the source under test, for example due to amplified spontaneous emission. Three of these techniques that operate on collections of samples that represent the electric field of the source under test are detailed below, but should not be considered as limiting for the practice of the present invention. Before performing any averaging step, we determine if the source is periodic or non-periodic. If the source is periodic, the average is performed on all measured samples, as will be described in a later section with respect to step 605. If the source is non-periodic, the average is performed on subsets of the measured samples, as will be described in a later section with respect to step 606.

The first averaging technique, 607A, consists in an independent averaging of the intensity (i.e. the square of the amplitude of the complex samples) and phase (i.e. the phase of the complex samples) components. The intensity average is calculated directly using the intensity of the samples corresponding to the same time in the bit slot of the source under test, illustratively the intensity of the electric field at time $p\delta t$ is calculated as the average of the intensity of the samples measured at times $p\delta t$, $p\delta t + T_{TEST}$, $p\delta t + 2T_{TEST}$, ... $p\delta t + qT_{TEST}$. The phase averaging is performed after considering the samples describing a period of the source under test and removing a linear phase component to these samples (see 802 of FIG. 8) to obtain the physical (or adjusted) phase (803 of FIG. 8) for this particular period of the source under test. The average phase is then calculated as an average of the phase of the samples corresponding to a given time in the bit slot of the source under test, illustratively the phase of the electric field at time $p\delta t$ is calculated using the phase of the samples measured at times $p\delta t$, $p\delta t + T_{TEST}$, $p\delta t + 2T_{TEST}$, ... $p\delta t + qT_{TEST}$. An electric field representation ($E_{TEST}$) is then calculated from the average intensity and average phase.

A second averaging technique, 607B, consists in an independent averaging of the amplitude and phase components. The amplitude average is calculated directly using the amplitude of the samples corresponding to the same time in the bit slot of the source under test, illustratively the amplitude of the electric field at time $n\delta t$ is calculated as the average of the amplitude of the samples measured at times $p\delta t$, $p\delta t + T_{TEST}$, $p\delta t + 2T_{TEST}$, ... $p\delta t + qT_{TEST}$. The phase averaging is performed after considering the samples describing a period of the source under test and removing a linear phase component to these samples (see 802 of FIG. 8) to obtain the physical (or adjusted) phase (803 of FIG. 8) for this particular period of the source under test. The average phase is then calculated as an average of the phase of the samples corresponding to a given time in the bit slot of the source under test, illustratively the phase of the electric field at time $n\delta t$ is calculated using the phase of the samples measured at times $p\delta t$, $p\delta t + T_{TEST}$, $p\delta t + 2T_{TEST}$, ... $p\delta t + qT_{TEST}$. An electric field representation ($E_{TEST}$) is then calculated from the average amplitude and average phase.

Figure 9:
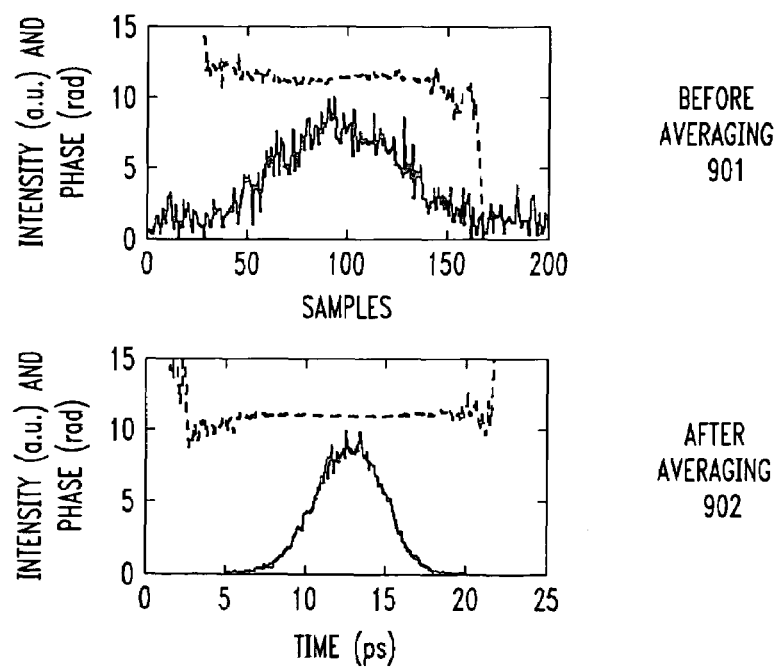
FIG. 9 shows an illustration of the sampled intensity and phase of a Source under test before and after averaging.

A third averaging procedure, 607C, relies on a direct averaging of the complex electric field (average of $E_{TEST}$) Illustratively, the electric field at a given time is calculated as the average of the complex samples measured at times $p\delta t$, $p\delta t + T_{TEST}$, $p\delta t + 2T_{TEST}$, ... $p\delta t + qT_{TEST}$. Again the measured phase is adjusted by removal of a linear phase on each period, as in the previous procedure. An electric field representation is then calculated for each period from the measured intensity and adjusted phase. The average electric field at each time in the period is then calculated from the various electric field representations. Since the complex electric field of an incoherent source averages to zero, such averaging can extract the periodic component of the source from a non-periodic incoherent background, such as amplified spontaneous emission. Shown in FIG. 9 is an illustration of the measured intensity and phase of a signal before 901 and after 902 averaging.

While averaging is powerful at correcting phase drifts, it is required that the coherence time between the Source under test and the Sampling source be at least of the order of the measurement time of a representative collection of samples, which is of the order of $$\frac{T_{TEST} \cdot T_{REF}}{\delta t}.$$

No phase information is otherwise recoverable from the samples, and only magnitude information is available. The above averaging techniques can be applied to either a periodic or a non-periodic Source under test. When the Source under test is periodic, as shown in FIG. 3A, all the measured samples are used to obtain a representation of the source under test. Illustratively, the intensity of the source under test 304 is obtained from the intensity of all the measured samples 302, and the phase of the source under test 305 is obtained from the phase of all the measured samples 303, and this leads to the representation of the electric field of the Source under test. This processing is done in step 606. However, when the Source under test is non-periodic (e.g., data encoded) as shown in FIG. 4A, groups of samples corresponding to each symbol of the Data Source under test are averaged in step 607. It should be noted that processor 501 is programmed to process separately each of the different symbol states of a non-periodic source (such as an amplitude or phase modulated signal). Illustratively, for an on/off keying signal, processor 501 will detect the two amplitude levels and separately process these two levels using the previously described procedures. For a signal using quadrature amplitude modulation (QAM), processor 501 will detect the different symbol states and separately process the samples from each of the multiple symbol states. Similarly, for a phase modulated signal using binary phase shift keying (BPSK) or quadrature phase shift keying (QPSK), processor 501 will detect the different symbol states and separately process the samples from each of the two symbol states for BPSK modulation or four symbol states for QPSK modulation.

Thus for example in FIG. 4A, the measured samples are used by processor 501 (step 607) to obtain a representation of the symbols S1 and S2 of the source under test. Illustratively, the intensity and phase waveforms 404 of S1 are obtained from the subset of the intensity 402 and phase 403 of the samples measured for symbol S1, while the intensity and phase waveforms 405 of S2 are obtained from the subset of the intensity 402 and phase 403 of the samples measured for symbol S2.

Figure 7A:
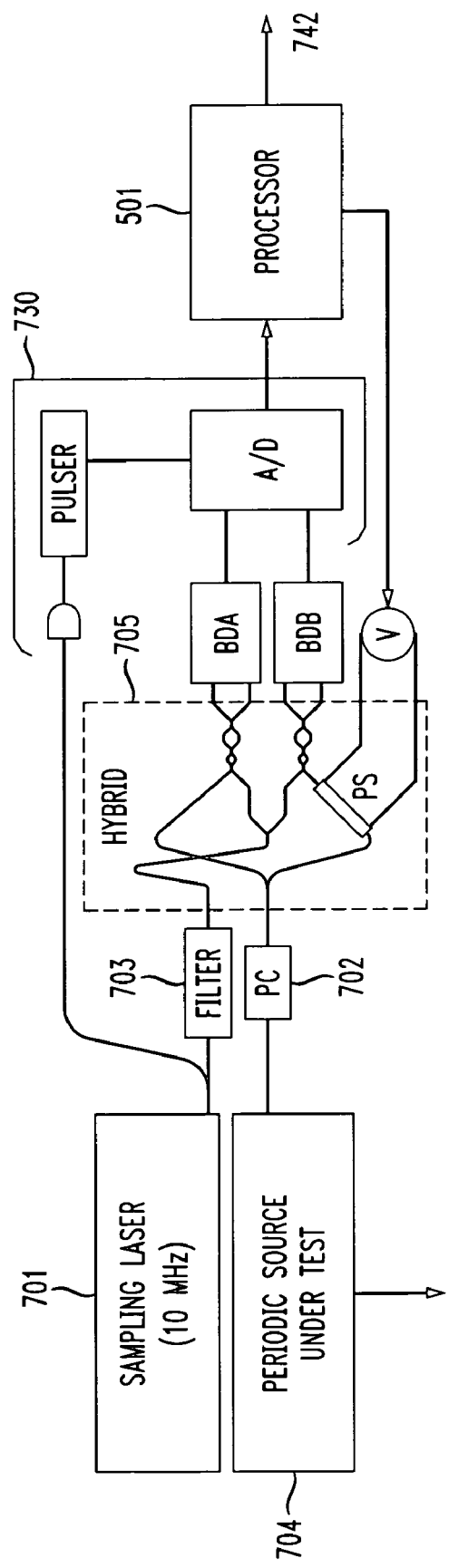
FIG. 7 illustrates an illustrative optical hybrid embodiment of the arrangement shown in FIG. 5B.

A more specific illustrative embodiment of the arrangement of FIG. 5 is shown in FIG. 7. This embodiment is essentially the same as the arrangement described in the previously reference application Ser. No. 10/782,003 and the publication by C. Dorrer, C. R. Doerr, I. Kang, R. Ryf, J. Leuthold, and P. Winzer, "Measurement of eye diagrams and constellation diagrams of optical sources using linear optics and waveguide technology," *J. Lightwave Technol.* 23, 178-186 (2005), the descriptions of which are both incorporated by reference herein.

The arrangement as shown in FIG. 7 uses a waveguide optical hybrid 705 based on silica waveguides on a silicon substrate to perform the splitting, recombining and phase adjustment. The Sampling source 701 is a 10 MHz passively mode-locked fiber laser. Its polarization state is aligned with that of the source under test with a polarization controller 702. The broadband output of the fiber laser 701 is spectrally filtered with a 3 nm Gaussian bandpass filter 703, which is sufficient to accurately characterize sources of a few picoseconds duration without deconvolution. Illustratively, the Periodic Source under test 704 was a pulse carver implemented using a monochromatic CW laser whose output was carved by a properly biased EAM driven by a 40 GHz RF sinewave.

Figure 7B:
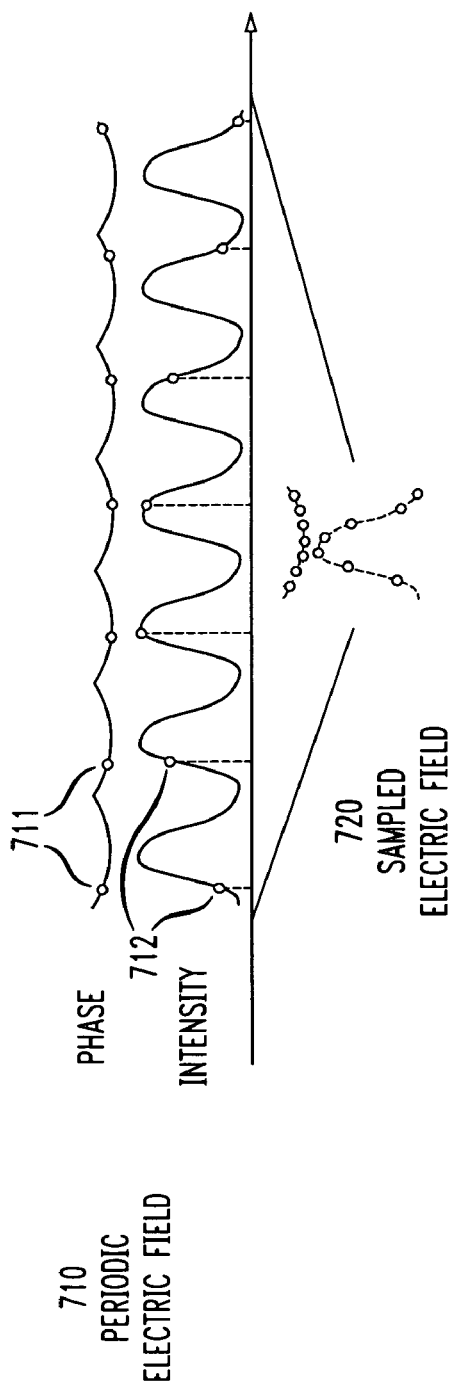

The simultaneous acquisition of the two quadratures $S_A$ and $S_B$ detected by the balanced detectors BDA and BDB is synchronized to the Sampling laser 701 using a low-speed photodiode and pulser 730. Processor 501 controls the phase adjustment voltage V to the phase shifter PS. Processor 501 includes the various circuitry and the data and program memory that is needed to perform the various sample collection, processing and averaging processing steps described in FIG. 6. Processor 501 performs the processing and averaging steps of FIG. 6 to obtain a representation of the amplitude and phase of the optical source under test 704, illustrated by the phase and intensity samples 720, shown in FIG. 7B. The phase and intensity samples of the periodic electric field produced by the interference of the Sampling laser 701 and Periodic Source under test 704 are shown by the set of dots 711 and 712, respectively. Advantageously, my technique does not require long-term locking between the Source under test 704 and the Sampling laser 701. Shown as 720 in FIG. 7B is the collection of the time-varying phase and intensity samples of the Source under test 704 which are produced at output 742 of Processor 501.

My inventive sampled test-plus-reference interferometric pulse characterization technique provides a direct, sensitive, real-time measurement of the electric field of a periodic or non-periodic optical source using its interference with a periodic sampling source. The technique is more generally applicable than prior test-plus-reference techniques. While my invention has been illustrated and described using a waveguide embodiment FIG. 7, it could also be implemented as a free-space interferometer, a polarization interferometer or a fiber interferometer.

Thus, various modifications of my invention will occur to those skilled in the art. Nevertheless all deviations from the specific teachings of this specification that basically rely upon the principles and their equivalents through which the art has been advanced are properly considered within the scope of the invention as described and claimed.

I claim:

1. A method for characterizing the electric field of an optical signal under test that includes a sequence of optical pulses at a first repetition rate, $T_{TEST}$, comprising the steps of:
   combining the optical signal under test with a reference signal being a sequence of optical pulses at a second repetition rate $T_{REF}$ that is equal to $MT_{TEST}+\delta t$ wherein $\delta t$ is a fraction of $T_{TEST}$;
   measuring the real and imaginary parts of the interference of the signal under test with each optical pulse from the sequence of optical pulses of the reference signal; and
   determining samples of the electric field of the optical signal under test every $\delta t$ from the measured real and imaginary parts.

2. The method of claim 1 wherein
   samples of the electric field of the optical signal under test measured every $\delta t$ are obtained by processing and organizing the samples determined for a plurality of optical pulses from the sequence of optical pulses.

3. The method of claim 1 wherein the optical signal under test is a periodic signal.

4. The method of claim 1 wherein the optical signal under test is a non-periodic signal and wherein in the measuring step the electric field is determined separately for each different state of the non-periodic signal.

5. The method of claim 1 wherein in the measuring step the amplitude and phase of the determined samples of the electric field are separately averaged to characterize the optical signal under test.

6. The method of claim 1 wherein in the measuring step the intensity and phase of the determined samples of the electric field are separately averaged to characterize the optical signal under test.

7. The method of claim 1 wherein in the measuring step the determined samples of the electric field are averaged to characterize the optical signal under test.

8. The method of claim 1 wherein
   in the measuring step an adjusted phase is determined by subtracting a linear phase component from the phase of the determined samples of the electric field and the adjusted phase is used as the phase of the electric field of the source under test.

9. The method of claim 1 wherein the optical signal under test is a data-modulated signal selected from a group including on/off keying, OOK, quadrature amplitude modulation, QAM, binary phase shift keying, BPSK, or quadrature phase shift keying, QPSK.

10. The method of claim 1 wherein the optical signal under test and reference signal are not derived from a common optical source.

11. An apparatus for characterizing the electric field of an optical signal under test that includes a first sequence of optical pulses at a first repetition rate, $T_{TEST}$, comprising:
    means for combining the optical signal under test with a reference signal being a second sequence of optical pulses at a second repetition rate $T_{REF}$ that is equal to $MT_{TEST}+\delta t$, wherein $\delta t$ is a fraction of $T_{TEST}$;

means for measuring the real and imaginary part of the interference of the signal under test with each optical pulse from the second sequence of optical pulses of the reference signal; and means for determining samples of the electric field of the optical signal under test every δt from the measured real and imaginary parts.

12. The apparatus of claim 11 being embodied using a technology selected from a group including a free-space embodiment, a waveguide embodiment, a polarization interferometer, or an optical fiber embodiment.

13. The apparatus of claim 11 wherein the measuring means includes a processor means for processing and organizing the samples determined for each optical pulse from the second sequence of optical pulses to obtain samples of the electric field of the optical signal under test every δt.

14. The apparatus of claim 13 wherein the processor means calculates an adjusted phase determined by subtracting a linear phase component from the phase of the determined samples and the adjusted phase is used to characterize the phase of the source under test.

15. The apparatus of claim 13 wherein the processor means performs an averaging function whereby the amplitude and phase of the electric field of the optical signal under test are obtained by independent averaging of the amplitude and phase of the determined samples of the electric field.

16. The apparatus of claim 13 wherein the processor means performs an averaging function whereby the intensity and phase of the electric field of the optical signal under test are obtained by independent averaging of the intensity and phase of the determined samples of the electric field.

17. The apparatus of claim 13 wherein the processor means performs an averaging function whereby the electric field of the optical signal under test is obtained by averaging the determined samples of the electric field.

* * * * *